United States Patent
Krishnan

(10) Patent No.: US 11,553,085 B2
(45) Date of Patent: Jan. 10, 2023

(54) METHOD AND APPARATUS FOR PREDICTING CUSTOMER SATISFACTION FROM A CONVERSATION

(71) Applicant: UNIPHORE SOFTWARE SYSTEMS INC, Palo Alto, CA (US)

(72) Inventor: Sekar Krishnan, Thuckalay (IN)

(73) Assignee: UNIPHORE SOFTWARE SYSTEMS, INC., Palo Alto, CA (US)

( * ) Notice: Subject to any disclaimer, the term of this patent is extended or adjusted under 35 U.S.C. 154(b) by 0 days.

(21) Appl. No.: 17/111,807

(22) Filed: Dec. 4, 2020

(65) Prior Publication Data

US 2022/0131975 A1 Apr. 28, 2022

(30) Foreign Application Priority Data

Oct. 23, 2020 (IN) .............................. 202011046401

(51) Int. Cl.

| | |
|---|---|
| H04M 3/51 | (2006.01) |
| G06N 20/00 | (2019.01) |
| G10L 15/02 | (2006.01) |
| G10L 15/22 | (2006.01) |
| G10L 15/18 | (2013.01) |
| G06Q 30/02 | (2012.01) |
| G10L 15/06 | (2013.01) |

(52) U.S. Cl.
CPC .......... *H04M 3/5175* (2013.01); *G06N 20/00* (2019.01); *G06Q 30/0201* (2013.01); *G10L 15/02* (2013.01); *G10L 15/063* (2013.01); *G10L 15/1815* (2013.01); *G10L 15/22* (2013.01)

(58) Field of Classification Search
CPC ..... H04M 3/5175; G06N 20/00; G10L 15/02; G10L 15/22
USPC ............ 379/265.06, 265.07, 265.05, 265.03, 379/266.08, 265.08
See application file for complete search history.

(56) References Cited

U.S. PATENT DOCUMENTS

| | | | |
|---|---|---|---|
| 10,593,350 B2* | 3/2020 | Liu | G10L 15/26 |
| 2017/0169438 A1* | 6/2017 | Maynard | G06Q 30/016 |
| 2019/0253558 A1* | 8/2019 | Haukioja | G10L 15/22 |
| 2019/0266622 A1* | 8/2019 | Turnbull | G06Q 30/0202 |

* cited by examiner

*Primary Examiner* — Thjuan K Addy
(74) *Attorney, Agent, or Firm* — Praveer K Gupta

(57) ABSTRACT

A method and an apparatus for predicting satisfaction of a customer pursuant to a call between the customer and an agent, in which the method comprises receiving a transcribed text of the call, dividing the transcribed text into a plurality of phases of a conversation, extracting at least one call feature for each of the plurality of phases, receiving call metadata, extracting metadata features from the call metadata, combining the call features and the metadata features, and generating an output, using a trained machine learning (ML) model, based on the combined features, indicating whether the customer is satisfied or not. The ML model is trained to generate an output indicating whether the customer is satisfied or not, based on an input of the combined features.

16 Claims, 3 Drawing Sheets

METHOD AND APPARATUS FOR PREDICTING CUSTOMER SATISFACTION FROM A CONVERSATION

CROSS REFERENCE TO RELATED APPLICATIONS

This application claims priority to Indian Application No. 202011046401, filed on Oct. 23, 2020, which is incorporated herein by reference in its entirety.

FIELD

The present invention relates generally to improving call center computing and management systems, and particularly to predicting customer satisfaction from a transcription of a conversation between a customer and a call center agent.

BACKGROUND

Several businesses need to provide support to its customers, which is provided by a customer care call center. Customers place a call to the call center, where customer service agents address and resolve customer issues, to satisfy the customer's queries, requests, issues and the like. The agent, who is a user of a computerized call management system used for managing and processing calls between the agent and the customer attempts to understand and resolve the customer's issues, and achieve customer satisfaction.

As such, customer satisfaction (CSAT) is fundamentally critical to any business. While CSAT appears to be a rather simple concept, with binary outcomes, viz., satisfied or not satisfied, understanding customer satisfaction is a very subjective exercise, depending on type of issue, customer and/or agent demographics, type of industry, among several other peripheral factors. In fact, CSAT is particularly hard for businesses to track and assess accurately or confidently over time.

Accordingly, there exists a need for techniques to predict customer satisfaction more accurately and/or with a higher degree of confidence.

SUMMARY

The present invention provides a method and an apparatus for predicting customer satisfaction from a conversation, substantially as shown in and/or described in connection with at least one of the figures, as set forth more completely in the claims. These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and an apparatus for predicting customer satisfaction from a conversation, for example, transcription of an audio conversation, such as a phone call, between an agent and a customer, and metadata associated with the call. Audio of the call is transcribed, and the transcription is organized into different phases of the conversation. For each phase, several call features are extracted, for example, based on agent and customer engagement, sentiment, positivity and negativity. Further, metadata features are extracted from call metadata including information about the customer, the agent, the business which the customer is calling about, and the like. Call metadata may be sourced from customer relationship management (CRM) tools of a business, or other sources. The call features and metadata features are combined and input into a trained machine learning (ML) model, which is trained to receive such combined features, and based on such combined features, the ML model is trained to generate an output indicating whether the customer is satisfied or not. The output generated by the ML model may be interpreted, for example, by a user or another program.

Training the ML model includes providing a training call comprising similar combined features and a known outcome of customer satisfaction for the training call. The ML model is trained by several such training calls, and validated with similar training calls comprising combined features, and the prediction of the ML model is compared to the known outcome of test calls. If the accuracy of the trained ML model is lower than a desired threshold value, the ML model is retrained using more training calls.

Figure 1:
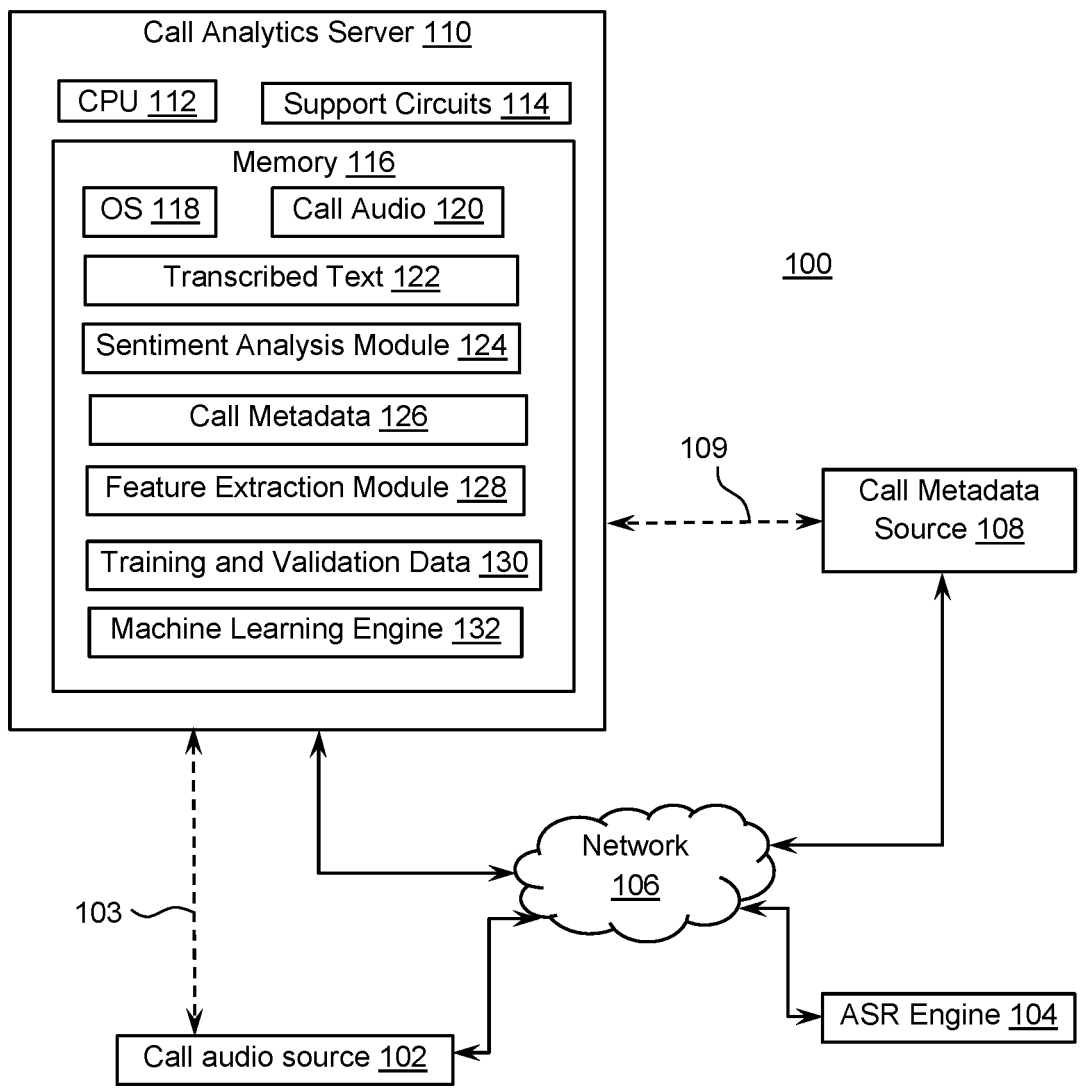
FIG. 1 is a schematic diagram depicting an apparatus for predicting customer satisfaction, in accordance with an embodiment of the present invention.

FIG. 1 is a schematic diagram of an apparatus 100 for predicting customer behavior in relation to a call between a customer and an agent, in accordance with an embodiment of the present invention. The apparatus 100 comprises a call audio source 102, an automatic speech recognition (ASR) engine 104, a call metadata source (CMS) 108, and a call analytics server (CAS) 110, each communicably coupled via a network 106. In some embodiments, the call audio source 102 is communicably coupled to the CAS 110 directly via a link 103, separate from the network 106, and may or may not be communicably coupled to the network 106. In some embodiments, the CMS 108 is communicably coupled to the CAS 110 directly via a link 109, separate from the network 106, and may or may not be communicably coupled to the network 106.

The call audio source 102 provides audio of a call to the CAS 110. In some embodiments, the call audio source 102 is a call center providing live or recorded audio of an ongoing call. In some embodiments, the call audio source 102 stores or streams multiple call audios, for example, received from a call center.

The ASR engine 104 is any of the several commercially available or otherwise well-known ASR engines, as generally known in the art, providing ASR as a service from a cloud-based server, a proprietary ASR engine, or an ASR engine which can be developed using known techniques. ASR engines are capable of transcribing speech data to corresponding text data using automatic speech recognition (ASR) techniques as generally known in the art. In some embodiments, the ASR engine 104 is implemented on the CAS 110.

The network 106 is a communication network, such as any of the several communication networks known in the art, and for example a packet data switching network such as the Internet, a proprietary network, a wireless GSM network, among others. The network 106 is capable of communicating data to and from the call audio source 102 (if connected), the ASR engine 104, the CMS 108 and the CAS 110.

The CMS 108 includes or is a customer relationship management (CRM) system of a business regarding which the customer makes the call to the business' call center agent, and includes information about the customer, the agent, the business itself, among other information relating to the call. In some embodiments, the CMS 108 additionally includes information obtained from conversational analytics and insights, for example, as enabled by AUMINA® or AUMINA® REAL-INTENT® provided by UNIPHORE® SOFTWARE SYSTEMS, INC. of Palo Alto, Calif. In some embodiments, the CMS 108 is implemented on the CAS 110.

The CAS server 110 includes a CPU 112 communicatively coupled to support circuits 114 and a memory 116. The CPU 112 may be any commercially available processor, microprocessor, microcontroller, and the like. The support circuits 114 comprise well-known circuits that provide functionality to the CPU 112, such as, a user interface, clock circuits, network communications, cache, power supplies, I/O circuits, and the like. The memory 116 is any form of digital storage used for storing data and executable software. Such memory includes, but is not limited to, random access memory, read only memory, disk storage, optical storage, and the like.

The memory 116 includes computer readable instructions corresponding to an operating system (OS) 118, a call audio 120, for example, audio of a call between a customer and an agent received from the call audio source 102, transcribed text 122, for example, transcribed from the call audio 120, a sentiment analysis module (SAM) 124, call metadata 124, a feature extraction module (FEM) 128, training and validation data 130, and machine learning (ML) model 132.

According to some embodiments, customer satisfaction prediction according to the embodiments described herein is performed in near real-time, that is, as soon as practicable, for example, as soon as the call is concluded and transcribed, for example, using the ASR engine. According to some embodiments, behavior analysis according to the embodiments described herein is performed later than near real-time, for example, well after a call is concluded. In some embodiments, audio of the call is stored on the CAS 110 as the audio 120.

According to some embodiments, the FEM 128 coordinates transcription of the call audio 120, for example, by sending the call audio to the ASR engine 104 over the network 106, and receives, from the ASR engine 104, the transcribed text 122. In some embodiments, the ASR engine 104 is implemented on the CAS 110. In some embodiments, the call audio source 102 is configured to send the call audio directly to the ASR engine 104, which is configured to generate and send the transcribed text corresponding to the call audio to the CAS 110. According to some embodiments, audio of the call is transcribed using ASR techniques known in the art and provided at the CAS 110.

According to some embodiments, the FEM 128 splits the transcribed text 122 into various phases of a conversation. The various phases of a conversation are organized according to beginning, middle, end of the conversation and the overall conversation, for the customer, for the agent and for both, that is the entire conversation, yielding 12 (4×3) phases. The beginning phase relates to opening of the call, for example, greetings and introduction, the middle phase relates to the substance of the call, that is the reason why the customer called and also referred to as a 'business' phase, and the end phase relates to closure of the call, for example, includes a summary, assurances or resolutions provided by the agent, and greetings. Various techniques may be used to divide the call into such phases. For example, in some embodiments, a predefined number of lines for each of the beginning and the end phases are defined, and the remaining are treated as the middle phase. In some embodiments, a percentage of the total number of lines is defined for each of the beginning and the end phases, and the remaining is treated as the middle phase. In some embodiments, a phase detection module (not shown) using i-vectors is used according to known techniques. Any other known techniques may be used in order to divide the transcribed text of the conversation into separate phases, within the scope of the embodiments described herein. The overall phase considers the entire call. In some embodiments, the boundaries of the beginning, middle and end are configurable via an input provided to the FEM 128, for example, by a user of the CAS 110.

For each of the 12 phases, the SAM 124 extracts a total number of words spoken by the customer and/or the agent indicating engagement of the agent and/or the customer, a sentiment score, positivity or a percentage of positive words, negativity or a percentage of negative words, yielding a total of 48 (12×4) call features. In some embodiments, the SAM is a sentiment analyzer, as known in the art, for example, lexicon and rule-based sentiment analysis tool, such as the predefined Valence Aware Dictionary and Sentiment Reasoner (VADER), capable of scoring each word with their sentiment weightage or corresponding intensity measure, and calculates the sentiment from the semantic orientation of word or phrases that occur in a text. The call features, so extracted from the transcribed text 122, may be stored in the FEM 128.

According to some embodiments, the call metadata 126 includes metadata related to the call, including information about the customer, the agent, or the business which the customer is calling, among other information relating to the call. The call metadata 126 may be received from the CMS 108, for example, and includes, without limitation, agent identification, agent department, resolution provided by the agent, customer identification, geographical location of the customer, language spoken by the customer, customer vocation, customer rating, customer feedback, business type, promotion(s) available, call duration, number of holds, duration of each hold, or total duration of hold(s).

The agent identification includes information such as the agent name and/or ID; the agent department indicates information about a relation of customer satisfaction on the department, for example, an inquiry department would likely have a higher customer satisfaction than a complaints department because of the nature of the departments; and resolution provided by the agent includes information on what kind of solution was provided and its relation with customer satisfaction, for example, some sort of credit, for example, refund, or store coupon would yield higher customer satisfaction than no refund or credit. The customer identification includes the name of the customer calling, an a unique identification associated with the customer, for example, to identify the customer's previous interactions, if it is a repeat call, and the like; location of the customer provides additional demographic clues that may influence customer satisfaction, for example, a culture, whether educated, educational background, economic situation, average age of the location; language spoken by the customer may impact customer satisfaction, for example, communications in a local language of the customer may likely increase customer satisfaction compared to another language, and such preferences may be analyzed for higher customer satisfaction; vocation of the customer includes information about how the customer would appreciate issues and resolution provide, for example, a customer working in the field computer software would be more understanding of issues related to computers as compared to a customer working in the agriculture industry; customer rating includes the rating of the customer, that is whether the customer is a repeat caller with the same phone number or caller identification, if the customer is a valued or loyal customer, if the customer has been inactive for a while, so that appropriate mitigations may be offered, such as promotional discounts, higher value discounts and the like; and customer feedback which the customer provides after the call.

The business type includes information about the business which may influence customer satisfaction, for example, pre-paid cell phone customers may be more likely to be dissatisfied than postpaid cell-phone customers, or cell-phone customers are more likely to be dissatisfied than, say, a cable television customers; and the promotion(s) available includes information on which offers have a higher efficacy in customer satisfaction. The call duration includes the total duration of the call, and short call would indicate lower customer satisfaction, while a long call would indicate a higher customer satisfaction; the number of holds would similarly impact customer satisfaction, with a higher number of holds leading to lower customer satisfaction, and no or lower number of holds leading to higher customer satisfaction; and the duration of each hold, or total duration of hold(s) affecting customer satisfaction, with longer duration hold times (individual or cumulative) leading to lower customer satisfaction, while lower number and/or duration of holds leading to higher customer satisfaction.

According to some embodiments, the FEM 128 extracts metadata features from the call metadata 126 by converting the information of the call metadata 126 to quantified entities. The metadata 126 fields as discussed above are converted to binary or multiple non-repetitive values, as appropriate. For example, whether educated—Yes (1), No 0); Resolution by Agent—provided (1), not provided (0); agent department—Enquiry (1), Complaint (2), claim 3), Policy Renewal (4), and the like; Caller Reputation—Good 1), Medium (2), Bad (3). Further, any reference numerical numbers may be assigned, however the same numerals must be always maintained for all the calls, whether training calls, or test calls. The numeric values are normalized using machine learning scaler, for example, MinMax Scaler, Standard Scaler, or others as generally known in the art. The metadata features may be stored in the FEM 128.

According to some embodiments, the FEM 128 combines the call features and the metadata features to yield combined features, which are input to the ML engine 132, which operates one or more machine learning model(s). The ML engine 132 is configured to generate an output indicating whether the customer is satisfied or not, based on the input of the combined features. In some embodiments, the output from the ML engine 132 directly determines whether the customer is satisfied or not. In some embodiments, the output from the ML engine 132 is interpreted, for example, by a user or a software module, to determine whether the customer is satisfied or not.

The ML model(s) of the ML engine 132 are pre-trained machine learning models, trained using combined features for calls for which customer satisfaction outcomes are known. The ML models of the ML engine 132 may use Machine Learning classifiers, for example, Random Forests, Gradient Boosting, Support Vector Machines and Logistic Regression, Convolutional Neural Network (CNN), Recurrent Neural Network (RNN), and the like. It is also understood that ML models include Artificial Intelligence (AI) models/techniques. As an example, a few techniques are briefly discussed here, however, all the techniques mentioned above, and similar techniques are understood to be within the scope of the disclosed embodiments.

Random forests classifiers are ensemble learners that operate by constructing multiple decision trees at training time and outputting the class that is the mode of the classes (classification) of the individual trees. Random Forest has two base working principles, viz., each decision tree predicts using a random subset of features; and each decision tree is trained with only a subset of training samples, which is known as bootstrap aggregating. Next, a majority vote of all the decision trees is used to predict the class of a given input.

In Gradient Boosting, XGB refers to eXtreme Gradient Boosting, which is an implementation of boosting that supports training the model in a fast and parallelized way. Boosting is also an ensemble classifier combining several weak learners, typically decision trees. The decision trees in XGB are trained in a sequential manner, unlike RFs, using forward stage-wise additive modeling. During early iterations, the decision trees learned are simple. As training progresses, the classifier becomes more powerful because it is made to focus on the instances where the previous learners made errors. At the end of training, the final prediction is a weighted linear combination of the output from the individual learners.

The ML models are trained by providing the combined features and the known outcomes of customer satisfaction for such calls, also referred to as training calls or training sets, comprised in the training and validation data 130. Once trained with a sufficient number of training calls, in some embodiments, the ML models of the ML engine 132 are validated using test calls or test sets, for which customer satisfaction outcomes are known, and the test calls are comprised in the training and validation data 130. In the validation mode, the combined features are provided as input to the ML engine 132. The output generated by the ML engine 132 is compared to the known outcomes to ascertain accuracy of the ML engine 132. If the accuracy is below a predefined threshold, then the ML models may be retrained using additional training calls or training sets in the manner described above, and the cycle is iterated till a desired level of accuracy is achieved. In some embodiments, Training and testing phases are normalized using the same scaling parameters.

Figure 2:
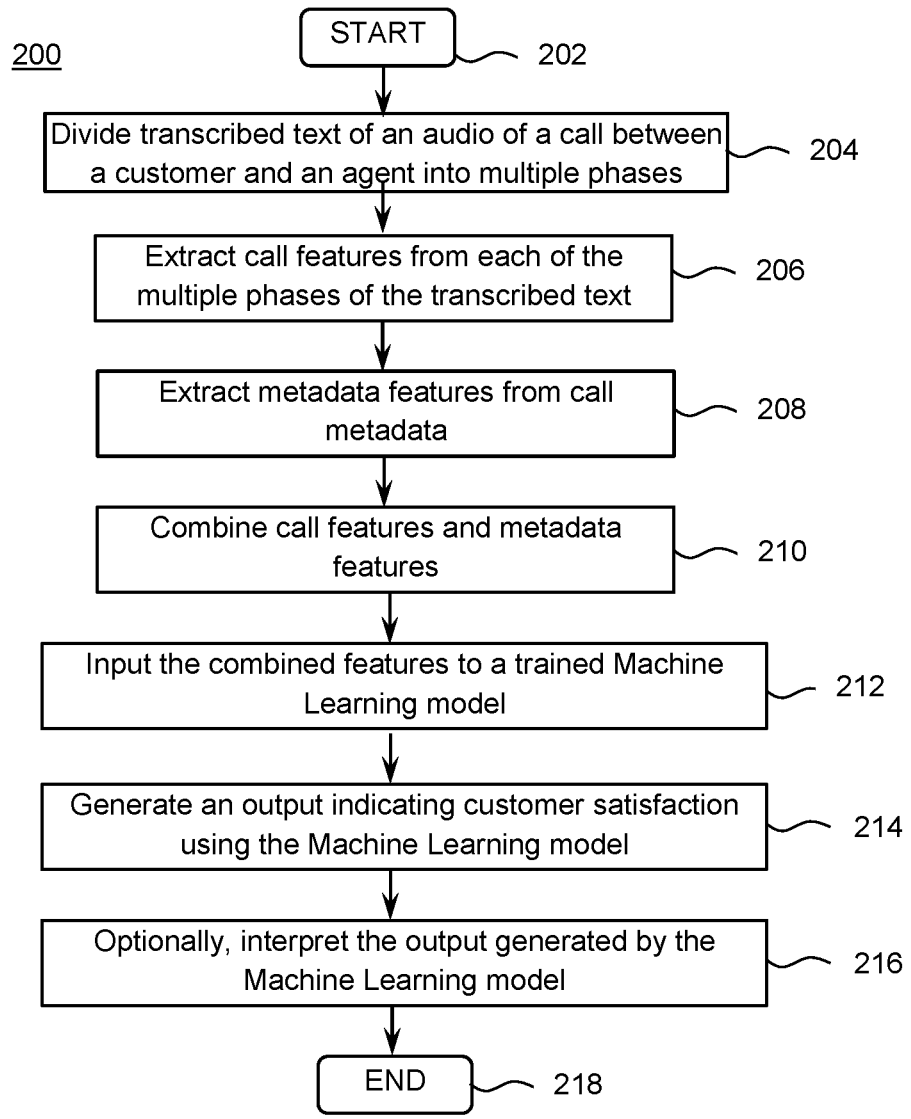
FIG. 2 is a flow diagram of a method for predicting customer satisfaction, for example, as performed by the apparatus of FIG. 1, in accordance with an embodiment of the present invention.

FIG. 2 is a flow diagram of a method 200 for predicting customer behavior, as performed by the apparatus 100 of FIG. 1, in accordance with an embodiment of the present invention. According to some embodiments, the method 200 is performed by the various modules executed on the CAS 110, in conjunction with the ASR engine 104 and the CMS 108. The method 200 starts at step 202, and proceeds to step 204, at which the method 200 divides a transcribed text of a call between a customer and an agent into multiple phases. The transcription text is, for example, the transcribed text 122 of FIG. 1, and in some embodiments, is divided into 12 phases, for example, by the FEM 128 of the CAS 110. The 12 phases include beginning, middle, end, and the overall (i.e., beginning to end) conversation, for the customer, for the agent and for both agent and the customer (i.e., entire conversation). The transcribed text 122 is organized into 12 distinct phases, namely, beginning of the entire conversation, beginning of the agent conversation, beginning of the customer conversation, middle of the entire conversation, middle of the agent conversation, middle of the customer conversation, end of the entire conversation, end of the agent conversation, end of the customer conversation, entire conversation, overall agent conversation, and overall customer conversation.

The method 200 proceeds to extracting call features from each of the phases, for example, the 12 phases into which the transcribed text 122 is organized according to step 204. The transcribed text 122 is obtained by transcribing the call audio 120 by the ASR 104, and may be performed at the CAS 110, or received by the CAS 110 from the ASR 104. For each of the 12 phases, a total number of words spoken by the customer and/or the agent indicating engagement of the agent and/or the customer, a sentiment score, positivity or a percentage of positive words, negativity or a percentage of negative words, are extracted, for example, by the SAM 124. yielding a total of 48 (12×4) call features. The call features, so extracted from the transcribed text 122, may be stored in the FEM 128.

The method 200 proceeds to step 208, at which the method 200 extracts metadata features from call metadata, for example, the call metadata 126. In some embodiments, the FEM 128 extracts the metadata features from the call metadata by converting the call metadata to numerical values, for example, as discussed above, and optionally storing the metadata features in the FEM 128.

The method 200 proceeds to step 210, at which the method 200 combines the call features from step 206 and the metadata features from step 208, to generate combined features. In some embodiments, step 210 is performed by the FEM 128. The FEM 128 defines the combined features as a vector, suitable for being input to one or more machine learning (ML) model(s). The method 200 proceeds to step 212, at which the method 200 inputs the combined features from step 210 to trained ML model(s). In some embodiments, the FEM 128 inputs the combined features to the ML engine 132, and at step 214, the method generates, using the ML model(s) of the ML engine 132, an output indicating customer satisfaction. In some embodiments, the output generated at step 214 directly predicts whether the customer is satisfied or not. In some embodiments, the method 200 proceeds to optional step 216, at which the method 200 interprets the output generated at step 214, for example, by a user of the apparatus 100, or by another software program.

The method 200 proceeds to step 218, at which the method 200 ends.

In this manner, the method 200, using one or more machine learning (ML) model(s) employed by the ML engine 132, the call features extracted from the transcribed text 122 and the metadata features extracted from the call metadata 126, predicts whether a customer is satisfied or not about the call with the agent.

Figure 3:
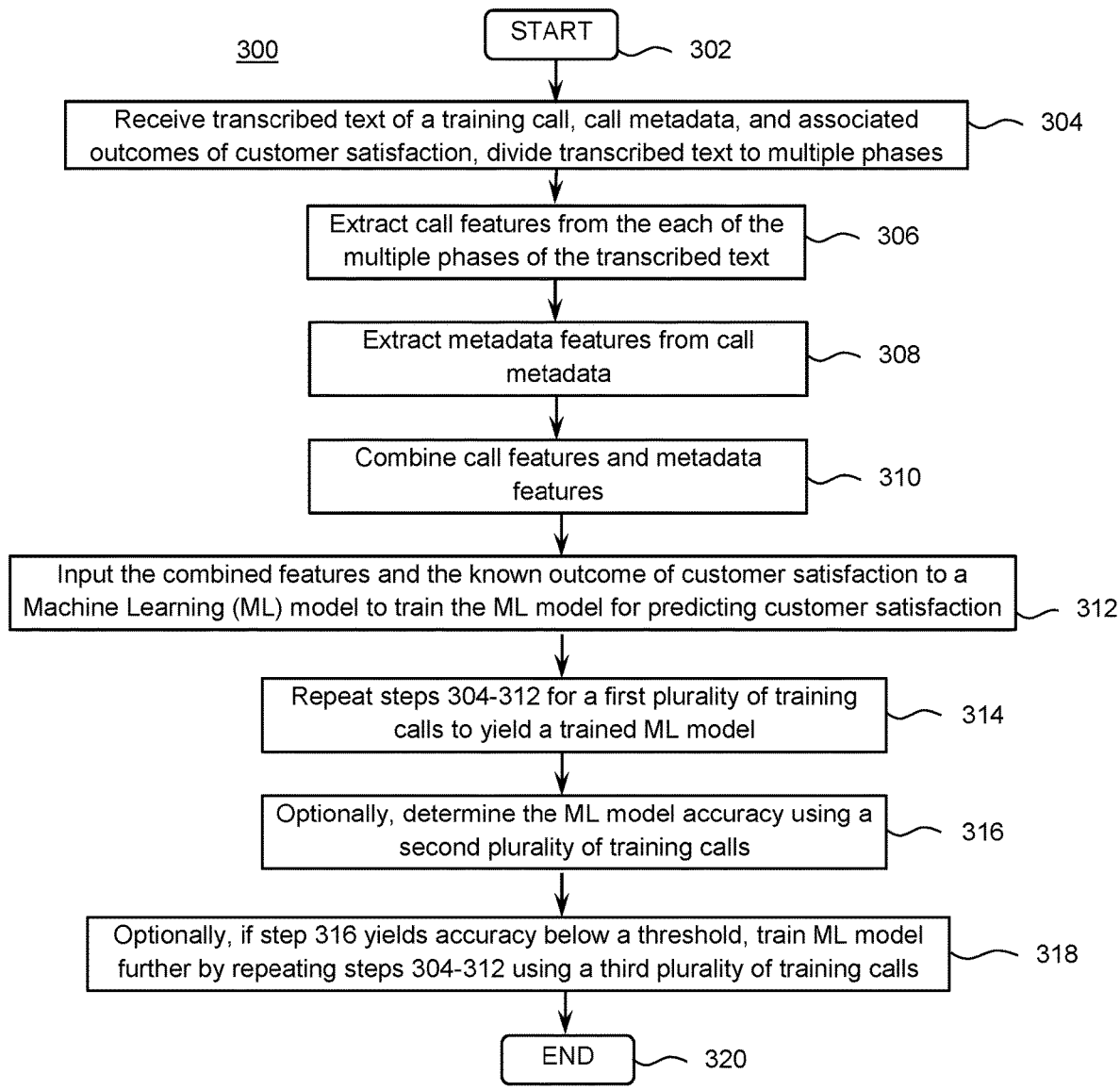
FIG. 3 is a flow diagram of a method for training a machine learning model predicting customer satisfaction, in accordance with an embodiment of the present invention.

The ML model(s) included in the ML engine 132 are trained using similar information, that is, calls between customers and agents for which customer satisfaction outcomes are known. The transcribed text of training calls are processed in a manner similar to that of method steps 204-210 to generate combined features. The combined features and the known outcome for a given training call is provided to the ML model(s) as a training set. The ML model(s) learn correlating the combined features to the known outcome, and several such different training sets are provided to the ML model(s). Once trained, the trained ML model(s) may be tested using some additional training calls, for which an outcome generated by the ML model(s) is compared with an actual customer satisfaction outcome of such calls. If the accuracy of the ML model(s) is lower than desired, for example a predefined threshold value, then the ML model(s) are trained further using additional training calls. FIG. 3 is a flow diagram of a method 300 for training an ML model for predicting customer behavior, for example, used in the ML engine 132 of the apparatus 100 of FIG. 1, in accordance with an embodiment of the present invention. According to some embodiments, the method 300 is performed by the various modules executed on the CAS 110, in conjunction with the ASR engine 104 and the CMS 108. In some embodiments, the transcribed call text and metadata are used multiple times in different combinations or using different tuned ML parameters, feature reduction, feature adding, and the like to improve accuracy. In some embodiments, the same transcribed data and metadata from CMS may also be used to train the ML model repeatedly to achieve a threshold accuracy. In some embodiments, training is done manually, and in some embodiments, training is done automatically using software programs designed for such training. The method 300 starts at step 302, and proceeds to step 304, at which the method 300 receives transcribed text of a training call, call metadata of the training call, and known customer satisfaction outcome for the training call. The method 300 divides the transcribed text to multiple phases, for example, as described with respect to step 204 of FIG. 2. The method 300 proceeds to step 306, at which the method 300 extracts the call features from each of the phases of the transcribed text, for example, as described with respect to step 206 of FIG. 2. The method 300 proceeds to step 308, at which the method 300 extracts the metadata features from call metadata for the training call, for example, as described with respect to step 208 of FIG. 2. At step 310, the method 300 combines the call features of step 306 and metadata features of step 308 to yield combined features.

The method 300 proceeds to step 312, at which the method 300 inputs the combined features as an input vector, and known outcome of customer satisfaction of the training call to the ML model(s). The ML model(s) are configured to 'learn' to relate the combined features and the outcome. At step 314, the method 300 repeats steps 304-312 for multiple training calls, to train the ML model(s) of the ML engine 132.

Optionally, the method 300 proceeds to step 316, at which the method validates the trained ML model(s), by providing an input of combined features of additional training calls and comparing the output generated by the ML model(s) to known outcomes for such training calls, and determines an accuracy of the ML model(s). Optionally, the method 300 proceeds to step 318, at which the method 300 further trains the ML model(s) using different training calls, different ML approach(es), different parameters tuning, weightage tuning, adding or removing some features, among other parameters, according to steps 304-312.

The method 300 proceeds to step 320, at which the method 300 ends.

The ML engine 132 uses ML model(s), such as those discussed above, trained according to the method 300, to predict customer satisfaction based on combined features extracted from a live or a pre-recorded call.

The described embodiments enable a superior prediction of customer satisfaction based on conversation of a customer with an agent, and such a prediction can be invaluable in retaining a customer, improving customer experience, and overall customer satisfaction.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

I claim:

1. A method for predicting satisfaction of a customer in relation to a call between the customer and an agent, the method comprising:
    dividing, at a call analytics server (CAS), a transcribed text of the call into a plurality of phases of a conversation,
    extracting, at the CAS, at least one call feature for each of the plurality of phases;
    receiving, at the CAS, call metadata;
    extracting, at the CAS, metadata features from the call metadata;
    combining, at the CAS, the call features and the metadata features; and
    generating, using a trained machine learning (ML) model, an output based on the combined features, the output indicating whether the customer is satisfied or not,
    wherein the ML model is trained to generate an output indicating whether the customer is satisfied or not, based on an input of the combined features.

2. The method of claim 1, wherein the plurality of phases comprises an opening phase, a substantive phase, a closing phase, and an overall phase corresponding to each of the entire conversation, the customer conversation, and the agent conversation, yielding a total of 12 phases.

3. The method of claim 2, wherein the at least one call feature comprises at least one of a total number of words spoken, a sentiment score, positivity or negativity,
    wherein the sentiment score is calculated by a sentiment analysis module
    wherein the positivity is a percentage of positive words, and
    wherein the negativity is a percentage of negative words.

4. The method of claim 3, wherein the at least one call feature comprises the total number of words spoken, the sentiment score, positivity and negativity for each of the 12 phases, and
    wherein the at least one call feature comprises 48 call features.

5. The method of claim 4, wherein the call metadata comprises information relating to at least one of the customer, the agent, the call, a business with which the call relates to.

6. The method of claim 5, wherein the metadata features comprise at least one of agent identification, agent department, resolution provided by the agent, customer identification, geographical location of the customer, language spoken by the customer, customer vocation, customer rating, customer feedback, business type, promotion(s) available, call duration, number of holds, duration of each hold, or total duration of hold(s).

7. A method for training a machine learning (ML) model for predicting satisfaction of a customer in relation to a call between the customer and an agent, the method comprising:
    for each of a first plurality of training calls, for each of which a customer satisfaction outcome is known, receiving, at a call analytics server (CAS), a transcribed text of a training call;
    dividing, at the CAS, the transcribed text into a plurality of phases of a conversation;
    extracting, at the CAS, at least one call feature for each of the plurality of phases;
    receiving, at the CAS, call metadata for each of the first plurality of training calls;
    extracting, at the CAS, metadata features from the call metadata;
    combining, at the CAS, the call features and the metadata features for each call of the first plurality of training calls; and
    providing the combined features of the training call, and the known outcome of customer satisfaction of the training call to the ML model.

8. The method of claim 7, further comprising:
    after training the ML model using the first plurality of training calls, determining the accuracy of the ML model using a second plurality of training calls; and
    if the accuracy of the ML model is below a predefined threshold, training the ML model using a third plurality of training calls.

9. The method of claim 7, wherein the plurality of phases comprises an opening phase, a substantive phase, a closing phase, and an overall phase corresponding to each of the entire conversation, the customer conversation, and the agent conversation, yielding a total of 12 phases,
    wherein at least one call feature comprises the total number of words spoken, the sentiment score, positivity and negativity, and
    wherein a total of 48 call features are extracted.

10. The method of claim 9, wherein the metadata features comprise at least one of agent identification, agent department, resolution provided by the agent, customer identification, geographical location of the customer, language spoken by the customer, customer vocation, customer rating, customer feedback, business type, promotion(s) available, call duration, number of holds, duration of each hold, or total duration of hold(s).

11. An apparatus for predicting satisfaction of a customer in relation to a call between the customer and an agent, the apparatus comprising:
- at least one processor;
- a memory communicably coupled to the at least one processor, the memory comprising computer executable instructions, which when executed using the at least one processor, perform a method comprising:
  - dividing, at a call analytics server (CAS), a transcribed text of the call into a plurality of phases of a conversation,
  - extracting, at the CAS, at least one call feature for each of the plurality of phases,
  - receiving, at the CAS, call metadata,
  - extracting, at the CAS, metadata features from the call metadata,
  - combining, at the CAS, the call features and the metadata features, and
  - generating, using a trained machine learning (ML) model, an output based on the combined features, the output indicating whether the customer is satisfied or not,
  - wherein the ML model is trained to generate an output indicating whether the customer is satisfied or not, based on an input of the combined features.

12. The apparatus of claim 11, wherein the plurality of phases comprises an opening phase, a substantive phase, a closing phase, and an overall phase corresponding to each of the entire conversation, the customer conversation, and the agent conversation, yielding a total of 12 phases.

13. The apparatus of claim 12, wherein the at least one call feature comprises at least one of a total number of words spoken, a sentiment score, positivity or negativity,
- wherein the sentiment score is calculated by a sentiment analysis module,
- wherein the positivity is a percentage of positive words, and
- wherein the negativity is a percentage of negative words.

14. The apparatus of claim 12, wherein the at least one call feature comprises the total number of words spoken, the sentiment score, positivity and negativity for each of the 12 phases, and
- wherein the at least one call feature comprises 48 call features.

15. The apparatus of claim 13, wherein the call metadata comprises information relating to at least one of the customer, the agent, the call, a business with which the call relates to.

16. The apparatus of claim 15, wherein the metadata features comprise at least one of agent identification, agent department, resolution provided by the agent, customer identification, geographical location of the customer, language spoken by the customer, customer vocation, customer rating, customer feedback, business type, promotion(s) available, call duration, number of holds, duration of each hold, or total duration of hold(s).

* * * * *